United States Patent
Barkan et al.

(10) Patent No.: US 12,158,794 B2
(45) Date of Patent: Dec. 3, 2024

(54) WAKEUP SYSTEMS FOR BIOPTIC INDICIA READERS

(71) Applicant: ZEBRA TECHNOLOGIES CORPORATION, Lincolnshire, IL (US)

(72) Inventors: Edward Barkan, Miller Place, NY (US); Christopher J. Fjellstad, Smithtown, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/103,780

(22) Filed: Jan. 31, 2023

(65) Prior Publication Data

US 2024/0256025 A1 Aug. 1, 2024

(51) Int. Cl.
*G06F 1/3296* (2019.01)
*G06K 7/14* (2006.01)

(52) U.S. Cl.
CPC ......... *G06F 1/3296* (2013.01); *G06K 7/1413* (2013.01)

(58) Field of Classification Search
CPC .. G06F 1/3296; G06K 7/1404; G06K 7/1413; G06K 7/1417
See application file for complete search history.

(56) References Cited

U.S. PATENT DOCUMENTS

| | | | |
|---|---|---|---|
| 2008/0110994 A1* | 5/2008 | Knowles ................. | G02B 27/48 235/462.42 |
| 2020/0309948 A1* | 10/2020 | Fabian .................... | G06T 7/246 |
| 2021/0374375 A1* | 12/2021 | Gururaja .............. | G06K 7/1439 |

* cited by examiner

*Primary Examiner* — Laura A Gudorf
(74) *Attorney, Agent, or Firm* — Yuri Astvatsaturov

(57) ABSTRACT

Embodiments of the present disclosure are directed to wakeup systems for indicia readers. In an example embodiment, the present invention leverages data sensed through a horizontal window of a bioptic barcode reader to switch from a sleep mode to a read mode. In particular, the sensed data may be used exclusively or as a determinative factor for waking up the barcode reader.

11 Claims, 4 Drawing Sheets

WAKEUP SYSTEMS FOR BIOPTIC INDICIA READERS

BACKGROUND

Multi-planar indicia readers (also known as bi-optic or bioptic indicia readers) are commonly employed in retail environments like grocery stores. While these readers can be used continuously, it is not typical to have a constant flow of goods which would maintain continuous functionality. As a result, it is desirable to put these readers into a suspended mode whereby at least some functional features are suspended to reduce wear-and-tear along with power consumption and processing resources. Conversely, these readers must also be able to come out of such suspended mode for normal indicia-reading operations when there is a need to process to-be-purchased goods. Thus, there is a need for improved devices, systems, and methods associated with wakeup systems for bioptic indicia readers.

SUMMARY

Accordingly, at least some embodiments of the present invention are directed to improved devices, systems, and methods associated with wakeup systems for bioptic indicia readers.

For example, in an embodiment, the present invention is a system or an indicia reader alternately operable in at least one or a first mode or a second mode, the first mode being different from the second mode. The indicia reader includes: a housing having (i) a lower housing portion with an upper surface facing a product scanning region and a substantially horizontal window and (ii) an upper housing portion extending above the lower housing portion with a substantially upright window; an imaging subsystem for capturing image data over a field of view (FOV) extending through the substantially horizontal window and through the substantially upright window into a product scanning region of the indicia reader; an illumination subsystem for providing illumination to the product scanning region; a decoder subsystem for analyzing at least a portion of the image data to decode an indicium; a sensing subsystem for obtaining sensing data through the substantially horizontal window; and a controller communicatively coupled to the imaging subsystem, the illumination subsystem, the decoder subsystem, and the sensing subsystem, the controller being configured to cause the indicia reader to transition from operating in the first mode to the second mode responsive to the sensing subsystem detecting, through the substantially horizontal window, a triggering event, wherein in the second mode the controller causes each of the imaging subsystem, the illumination subsystem, and the decoder subsystem operate at relatively full functionality, and wherein in the first mode the controller causes at least one of the imaging subsystem, the illumination subsystem, and the decoder subsystem operate at relatively reduced functionality.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
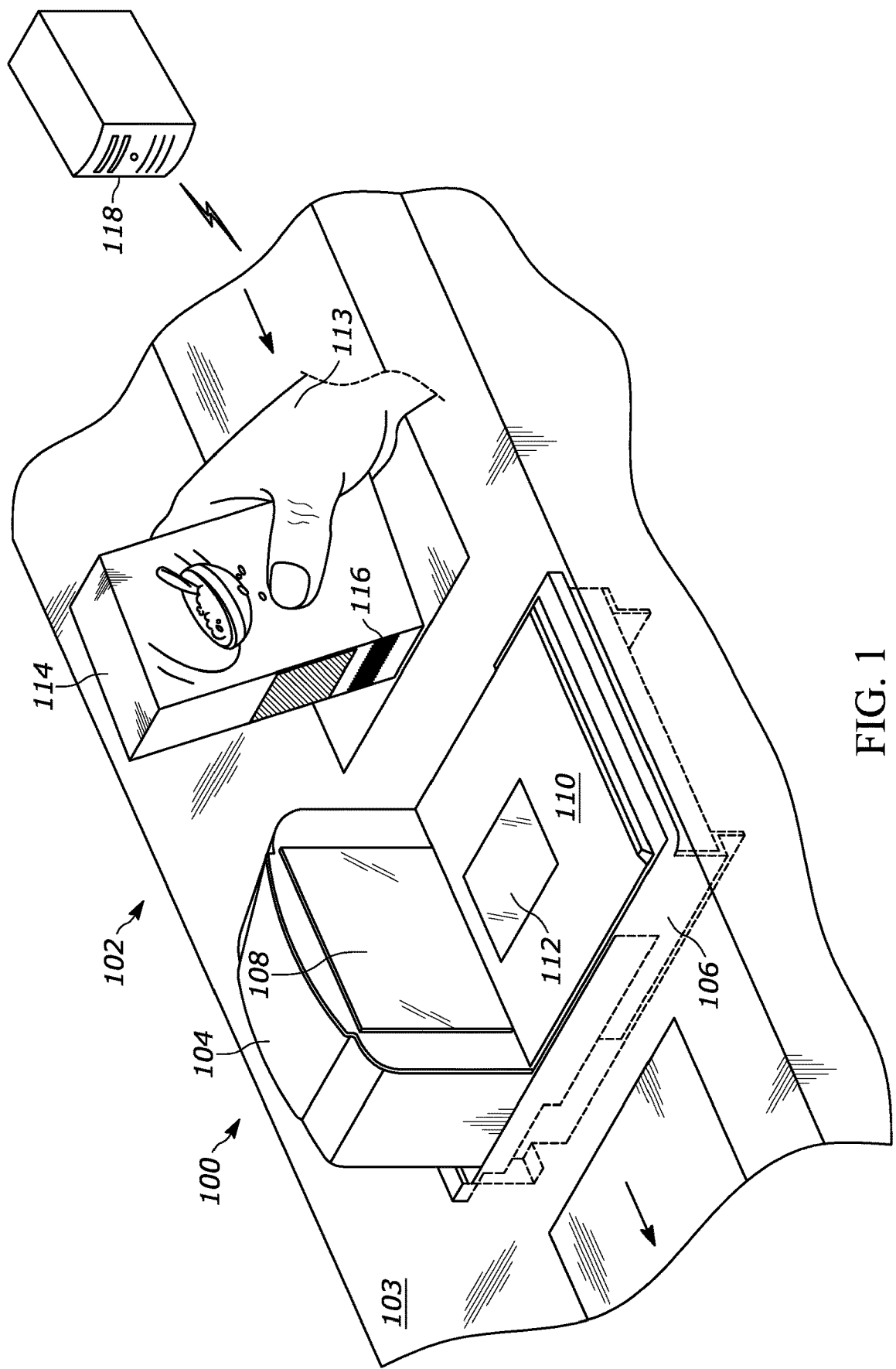
FIG. 1 is a perspective view of an example barcode reader that may be used to implement inventive concepts described here.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

FIG. 1 illustrates a perspective view of an example bioptic indicia reader 100 operable to utilize various wakeup system configurations in accordance with embodiments of the present disclosure. As used herein, the term indicia should be understood to refer to any kind of visual marker that can be associated with an item. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and a horizontally extending field of view which passes through the window 108. The lower housing 106 can be characterized by a weigh platter 110 that includes an optically transmissive window 112 positioned therein along a generally horizontal (also referred to as a transverse) plane and a vertically extending field of view which passes through the window 112. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data is transmitted to a communicatively coupled host 118 (commonly comprised of a point of sale (POS) terminal).

Indicia reader 100 can utilize a variety of imaging assemblies and optical components (collectively referred to as imaging subsystem(s)) to achieve the desired field of view(s) FOV(s) over which image data can be captured and transmitted to a processing host (such as a decoder (aka decoder subsystem), processor, or ASIC that may be internal to the indicia reader 100) for decoding of indicia and further utilization of the decoded payload data. For example, an imaging assembly may include an image sensor (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s). In instances where multiple imaging assemblies are used, each respective imager and imaging lens assembly pair is designed to operate together for capturing light scattered, reflected, or emitted from indicia as pixel data over a respective FOV. In other instances, a single imaging assembly may be used to generate a single primary FOV which may be split, divided, and/or folded to generate multiple FOVs by way of splitter and/or fold mirrors. In such cases, data collected from various portions of the imaging sensor may be evaluated as if it was obtained by an individual imaging assembly/imaging sensor.

Figure 2:
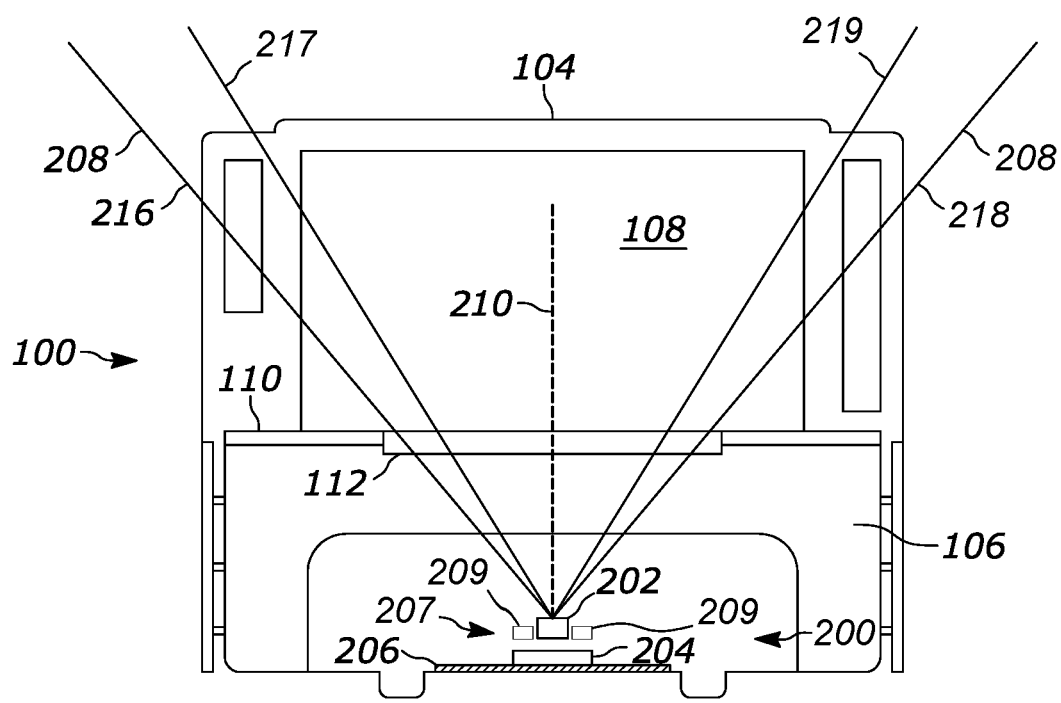
FIG. 2 is a front schematic block diagram view of an example barcode reader of FIG. 1.
Figure 3:
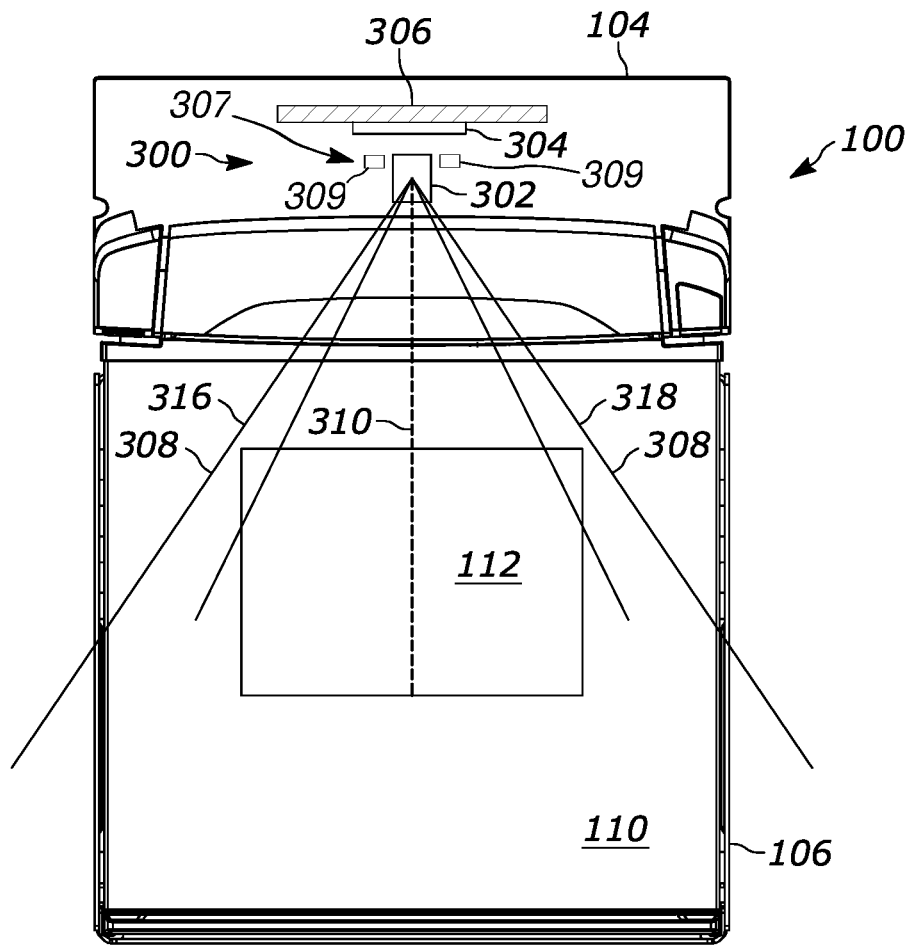
FIG. 3 is a front schematic block diagram view of an example barcode reader of FIG. 1.

Turning to FIGS. 2-3, shown therein are schematic views of an optical arrangement of a bioptic reader in accordance with an embodiment of the present invention. In this embodiment, the reader 100 employs a first imaging assembly 200 and a second imaging assembly 300. Each respective imaging assembly includes a respective optics assembly 202, 302, and a respective image sensor 204, 304 positioned on a respective printed circuit board 206, 306. Each lens assembly includes one or more lenses configured to direct light over a certain field of view (FOV) onto the respective image sensor. By these means, each image sensor is operative to capture image data representative of an environment that appears within each respective FOV. It should be appreciated that while each respective FOV is referred to separately, it is also within the scope of this disclosure to have all FOVs referred to by a singular FOV. For example, a reference to a FOV of an imaging subassembly could include a reference to multiple FOVs each respectively belonging to the first imaging assembly 200 and the second imaging assembly 300.

During typical reading operations, as object 114 passes through the product scanning region, an illumination subsystem is used to help illuminate the object 114 so as to help the reader 100 capture image data of sufficient quality to successfully decode an indicium that may be present therein. The illumination subsystem 207, 307 may include illumination sources 209, 309 that are configured to emit light over at least a portion of the scanning region from directions that are substantially co-directional with the respective FOVs. Illumination sources 209, 309 may be formed by one or more light emitting diodes and the emission of light therefrom may be synchronized with the imaging subsystem such that object 114 is illuminated for at least a portion of time that the imaging subsystem is exposing its imaging sensor(s) to capture image data. The illumination subsystem may be configured to emit light of any desired wavelength, where in some embodiments that light appears as while light to the operator of the reader. It may further be configured to emit light at varying intensities. In some embodiments, this is achieved by reducing or increasing the duration over which the source is active over a series of illumination pulses. In other embodiments, this is achieved by increasing or decreasing the amount or lumens generated by the illumination sources. Furthermore, it should be appreciated that the illumination subsystem may be formed using one or more sources and the desired fields of illumination may be achieved with the use of common optical elements like lenses, fold mirrors, and/or splitter mirrors. In some cases, at least some of these elements (e.g., fold mirrors/splitter mirrors) may be shared with the imaging subsystem. In other cases, the illumination subsystem may rely on its own set of optical elements. Additionally, in some cases the components of the illumination subsystem may be positioned with a direct illumination path without involving mirrors.

Referring to FIG. 2, the first imaging assembly 200 is configured to capture image-data over a first FOV (FFOV) 208. As illustrated, FFOV 208 extends through the generally horizontal window 112 and is directed at the product scanning region of the reader 100. The FFOV 208 includes an FFOV central axis 210, an FFOV proximal boundary, an FFOV distal boundary, a first FFOV lateral boundary 216, and a second FFOV lateral boundary 218. In the provided embodiment, the FFOV proximal boundary is closer to a surface of the upper housing 104 facing the product scanning region (e.g., a surface defined by the windows 108 that is facing the product scanning region) than the FFOV distal boundary, when the FFOV 208 extends in front of the that surface. While in some embodiments the central axis 210 of the FFOV 208 is normal to a transverse plane defined by the platter 110, in other embodiments the central axis 210 is inclines at up to 20 degrees relative to the transverse plane.

Turning to FIG. 3, the second imaging assembly 300 is configured to capture image-data over a second FOV (SFOV) 308. As illustrated, SFOV 308 extends through the generally upright window 108 and is directed at the product scanning region of the reader 100. The SFOV 308 includes a SFOV central axis 310, a SFOV upper boundary, a SFOV lower boundary, a first SFOV lateral boundary 316, and a second SFOV lateral boundary 318. In the provided embodiment, the SFOV lower boundary closer to the top surface of the lower housing 106 than the SFOV upper boundary. It should be appreciated that FFOV and SFOV may also be referred to, herein, as respective sub-FOVs regardless of whether they are obtained with the use of multiple imaging sensors with direct line-of-sight, multiple imaging sensors with non-direct line-of-sight optics (e.g., splitter/fold mirrors), or a single imaging sensor with non-direct line-of-sight optics (e.g., splitter/fold mirrors).

Figure 4:
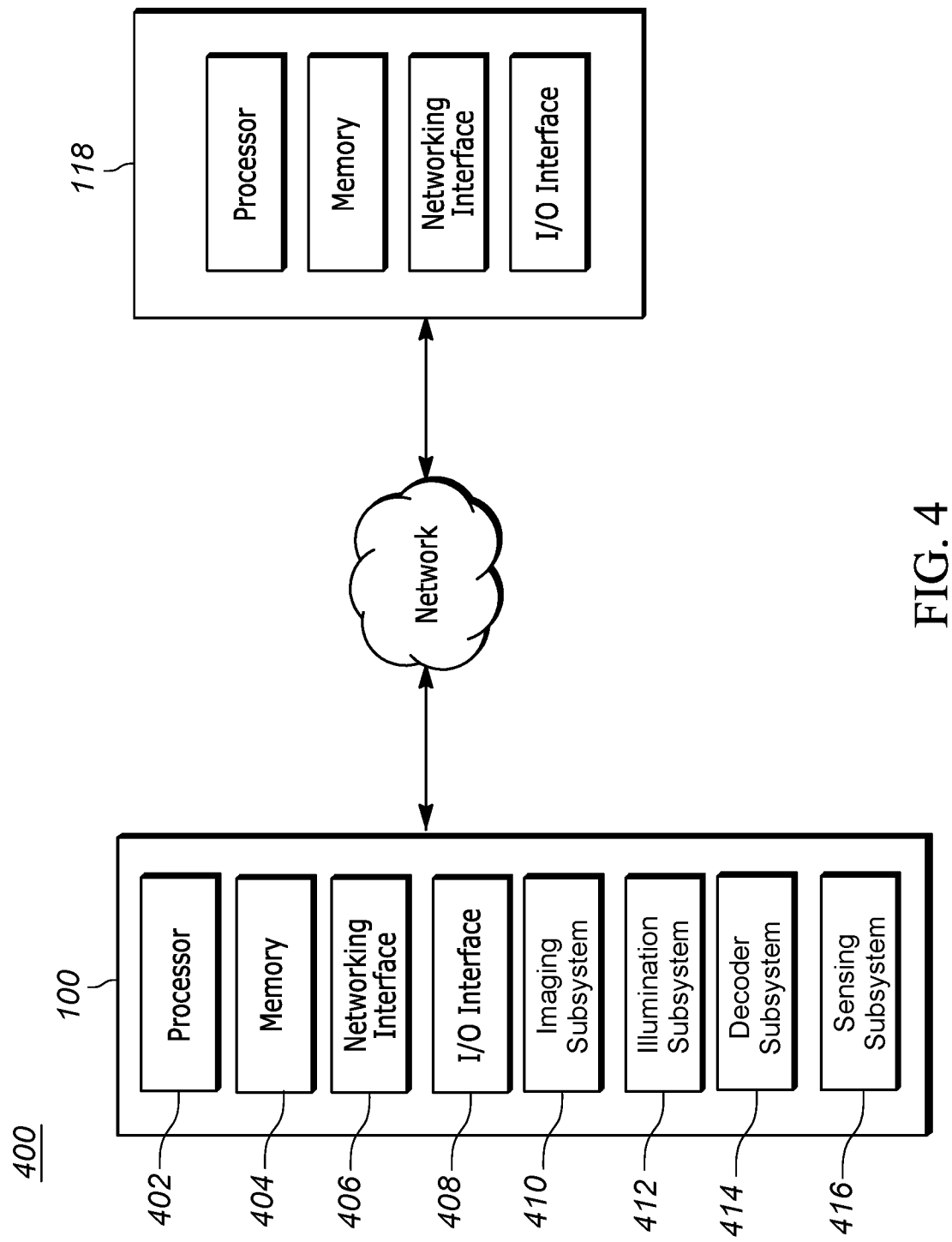
FIG. 4 is a block diagram representative of logical components of the example barcode reader of FIG. 1.

FIG. 4 is a block diagram representative of an example logic circuit capable of implementing, for example, one or more components of the example wakeup systems for bioptic indicia readers described herein, along with it being communicatively coupled to a POS station. The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes a processor 402 such as, for example, one or more microprocessors, controllers, and/or any suitable type of processor. The example processing platform 400 of FIG. 4 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations described herein. Additionally or alternatively, machine-readable instructions corresponding to the example operations described herein may be stored on one or more removable media (e.g., a compact disc, a digital versatile disc, removable flash memory, etc.) that may be coupled to the processing platform 400 to provide access to the machine-readable instructions stored thereon.

The example processing platform 400 of FIG. 4 also includes a network interface 406 to enable communication with other machines via, for example, one or more networks. The example network interface 406 includes any suitable type of communication interface(s) (e.g., wired and/or wireless interfaces) configured to operate in accordance with any suitable protocol(s).

The example, processing platform 400 of FIG. 4 also includes input/output (I/O) interfaces 408 to enable receipt of user input and communication of output data to the user.

In certain embodiments, processing platform may be seen as being implemented in the indicia reader 100 whereby the processor (a.k.a. controller) 402 is configured to control the imaging subsystem 410, the illumination subsystem 412, the decoder subsystem 414, and the sensing subsystem 416, as described throughout this disclosure.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

While indicia reader 100 may operate continuously under full functionality, to reduce power consumption, processing loads, and/or lessen the illumination emitted by the reader 100, the reader may alternately switch between one of two modes of operation. In one mode of operation the reader may operate with relatively reduced functionality while in the other mode the reader may operate in relatively increased (e.g., full) functionality.

Considering the relatively increased (e.g., full) functionality mode (may also be referred to as a "read mode"), in this mode the reader may be expected to be functioning in a way where it is capturing image data and actively providing it to the decoder to identify indicia that may be present in the captured frames. Normally, when operating in this mode, the imaging subsystem will be capturing image frames (from one or more of its image sensors) at a predetermined framerate (e.g., 45 FRP, 60 FPS, 120 FPS) that, in some embodiments is a maximum operable framerate for the respective image sensor. In some embodiments, in instances where an imaging sensor is associated with a FFOV and another imaging sensor is associated with the SFOV, exposure times of the sensors may (but do not have to) be staggered to prevent illumination associated with the non-subject image sensor from interfering with the operation of the subject image sensor. In other instances, data from a single image sensor may be segmented into two or more datasets, where each dataset is associated with its own sub FOV (e.g., FFOV and SFOV).

At the same time, when operating in the relatively increased (e.g., full) functionality mode, the reader activates its illumination subsystem to providing illumination to the product scanning region. This is generally done to illuminate the object being scanned (e.g., object 114) and capture an image of sufficient quality to be able to perform decoder-analysis operations. It should be appreciated that readers like reader 100 may operate at relatively high framerates (e.g., 60 FPS, 120 FPS) in conjunction with requiring relatively blur-free images. To achieve such image quality, exposure time has to be reduced, and to compensate for this reduction in exposure time, illumination must be activated. At the same time, it may not be necessary to drive the illumination subsystem to its maximum operational capacity as providing excess light may be wasteful and/or may pose an annoyance to the end-user. Accordingly, in the relatively increased (e.g., full) functionality mode of operation, the illumination subsystem is configured to provide a predetermined amount of illumination that is predetermined to be sufficient for illumination of targets in connection with capturing image data for decoding operations.

When image data is captured in the read mode, it is typically transmitted to the decoder subsystem for various operation(s). These may include machine vision analysis on the image data to identify decodable indicia (like a decodable 1D or 2D barcodes) and decode the identified barcode identifying the encoded payload in the process. From there, the decoder subsystem is able to transmit the payload further downstream for use by other subsystems, modules, or devices (e.g., POS device).

As noted previously, to reduce power consumption, processing loads, and/or lessen the illumination emitted by the reader 100, the reader may alternately switch to a relatively reduced functionality mode (may also be referred to as "sleep mode" or "suspended mode"). In this mode, at least one of the imaging subsystem, the illumination subsystem, and the decoder subsystem operate at relatively reduced functionality.

Taking, for example, the imaging subsystem, the one or more imaging sensors forming the imaging subsystem may be instructed to operate at a reduced framerate. For example, if in the 'read mode' the reader operates the one or more imaging sensors of the imaging subsystem at 60 FPS, in the 'sleep mode' the one or more imaging sensors of the imaging subsystem may operate at 45 FPS or 30 FPS. Additionally or alternatively, in the 'sleep mode,' the imaging subsystem may be instructed to operate to only capture data from a portion of its overall available FOV. For example, in 'sleep mode' the reader may only be capturing image data from the FFOV extending through the substantially horizontal window. This may be achieved by activating only the imaging components associated with that FOV. In cases of separate image sensors, this may mean that only the image sensor associated with that FOV is activated and image data therefrom is captured. Conversely, in such case the second image sensor may be deactivated. For example, when in 'sleep mode,' the imaging subsystem may be configured to maintain imager 202 in an activated state and further maintain the imager 302 in a deactivated state. In cases where an image sensor is used for multiple FOVs, only a certain portion of the sensor may be activated (e.g., a portion associated with the FFOV) to so as to enable the capture of image data from the respective FOV). Additionally, such selective capture of image data can also be implemented for embodiments where multiple image sensors are employed. For instance, referring to FIG. 2, when operating in 'sleep mode,' the sensor 202 could be operated in a manner where only the edge portion of the FOV between boundaries 216 and 217 and/or between 218 and 219 are captured. Exemplary use of image data obtained in connected with such operations with become clearer later in this disclosure.

Concerning the illumination subsystem, when in sleep mode, it an also function at reduced functionality. In some implementations the intensity of the light outputted by the illumination subsystem may be reduced. This could be achieved in a number of ways. For example, activation duration of any of the light sources of the illumination subsystem could be shortened for each illumination pulse, reducing the overall amount of light emitted over a given period of time. Alternatively, the amount or lumens generated by the illumination sources may be decreased during the activation of any of the illumination sources, similarly resulting in reduced overall intensity. In some cases, it may be desirable to reduce or deactivate only a portion of the illumination subsystem. For example, in some embodiments one portion 307 of the illumination subsystem may be partially or fully reduced in functionality while another portion 207 of the illumination subsystem remains operational at reduced of full operational functionality.

As far as the decoder subsystem, it too can operate at reduced functionality when reader 100 is operating in 'sleep mode.' In some implementations, this means that the decoder subsystem does not receive image data for processing. This may be a function of the overall controller which directs data between reader components or a function of the decode subsystem not taking any action on the data that is received from either the controller or the imaging subsystem. In this manner, the decoder subsystem can avoid conducting machine vision analysis operations which would normally cause the decoder subsystem to search at least a portion of an image for a potential presence of a barcode, decode that barcode, and thereafter report the decoded payload downstream for further processing. In other implementations, the decoder subsystem may be instructed to not report any decoded payload data to a host.

The switch between the relatively increased functionality (e.g., read mode) and the relatively reduced functionality (e.g., sleep mode) can be based on a detection of a triggering event or a lack thereof. To detect the presence of this triggering event, the reader 100 includes a sensing subsystem that is configured to sense environmental data through the substantially horizontal window 112. While in some implementations the sensing subsystem is formed by a separate set of complements, in other implementations the sensing subsystem can be partially or fully comprised of components described above.

For example, in some embodiments the sensing subsystem is formed at least partially by the imaging subsystem, and specifically the components associated with the FFOV 208 which passes through the substantially horizontal window 112. Specifically, the reader may be configured, while operating in sleep mode, to monitor the image data received from the FFOV 208 for a presence of an item. A detection of such presence may be viewed as a triggering event, causing the trader to switch from 'sleep mode' to 'read mode.' As previously discussed, in 'sleep mode' the illumination subsystem may be operating at reduced functionality. To that extend, in some implementations, in 'sleep mode' the illumination may be alternately switched between being activated and deactivated with the imaging subsystem capturing respective frames coinciding with those periods. Frames captured during that the activated and deactivated illumination could be analyzed against each other and if a sufficient change in image data could be detected, such change may be interpreted as an object being brought into the FFOV 208, causing the detection of a triggering event. In some instances, to reduce processing load, only a certain portion of the image data captured over the FFOV 208 may be evaluated to determine a presence of an item. For example, as noted previously, analysis of the image data received from the FFOV 208 may be limited to the edge portion of the FFOV 208 between boundaries 216 and 217 and/or between 218 and 219.

In a preferred embodiment, the triggering event sensed through the substantially horizontal window 112 is a determinative factor in having the controller cause the indicia reader 100 to transition from operating in one mode to another mode. In other words, while sensed data may be received from other sensors (e.g., a sensor configured to gather data through the substantially upright window 108), such data alone will not be sufficient to cause the reader to switch modes and the reader will not switch modes unless the triggering even is sensed through the horizontal window. In some embodiments, the switch from one mode to another may be done exclusively based on data sensed through the horizontal window (e.g., without regard for secondary sensed data sensed through the substantially vertical window).

While in the above examples 2D image data is used from the imaging subsystem, in other examples the imaging system may include a depth sensor (e.g., depth camera) that can be used alone or in conjunction with the 2D data. As with the description above, the depth sensor should be oriented to gather depth data through the substantially horizontal window 112 to detect for a presence of an object some predetermined distance away from the sensor/platter 110. The depth sensor may be formed by a structured light sensor, a time-of-flight sensor, or a stereo sensor, and may be formed as part of the imaging sensor 202 or may be positioned separate from it.

Preferably, data received by the imaging subsystem over the FFOV 208 for evaluation of the triggering condition is received along an optical path that is angled at up to 20 degrees relative to an axis normal to the substantially horizontal window 112.

While the initial detection of a triggering event may signal the reader to transition from the 'sleep mode' to 'read mode,' not detecting, through the substantially horizontal window 112, a subsequent triggering event for a predetermined time may also be used to transition the reader from the 'read mode' back to the 'sleep mode.' For example, if the imaging subsystem fails to detect the presence of any objects in the FFOV 208 for some time (e.g., 1 second, 5 seconds, 20 seconds, etc.), the reader may then transition from 'read mode' to 'sleep mode.' It should be appreciated that the same sensing techniques described above are equally applicable to the detection of a lack of a triggering signal.

The advantage of considering sensed data through the substantially horizontal window 112 and particularly of relying on it as a determinative factor in having the controller cause the indicia reader 100 to transition from operating in one mode to another mode is that only items that are brought over the window and/or events that occur over the window will cause the reader to enter into the 'read mode.' This can help reduce unexpected and/or unwanted illumination and can help maintain the reader in the 'sleep mode' during a more accurate timeframe where no action is occurring in the product scanning region. Such effective transition may not be recognized when relying on data sensed through the upright window 108 as such data could often include objects/people moving in a distance and away from the reader's product scanning region.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. An indicia reader alternately operable in at least one of a first mode or a second mode, the first mode being different from the second mode, the indicia reader comprising:
   a housing having (i) a lower housing portion with an upper surface facing a product scanning region and a substantially horizontal window and (ii) an upper housing portion extending above the lower housing portion with a substantially upright window;
   an imaging subsystem for capturing image data over a field of view (FOV) extending through the substantially horizontal window and through the substantially upright window into a product scanning region of the indicia reader, the imaging subsystem including an imaging sensor;
   an illumination subsystem for providing illumination to the product scanning region;
   a decoder subsystem for analyzing at least a portion of the image data to decode an indicium;
   a sensing subsystem for obtaining sensing data through the substantially horizontal window; and
   a controller communicatively coupled to the imaging subsystem, the illumination subsystem, the decoder subsystem, and the sensing subsystem, the controller being configured to cause the indicia reader to transition from operating in the first mode to the second mode responsive to the sensing subsystem detecting, through the substantially horizontal window, a triggering event, the triggering event being a determinative factor in having the controller cause the indicia reader to transition from operating in the first mode to the second mode,
   wherein:
   in the second mode the controller causes each of the imaging subsystem, the illumination subsystem, and the decoder subsystem to operate at relatively full functionality;
   in the first mode the controller causes at least one of the imaging subsystem, the illumination subsystem, and the decoder subsystem to operate at relatively reduced functionality;
   the FOV includes a first sub-FOV associated with a first portion of the imaging sensor and extending through the substantially horizontal window, and a second sub-FOV associated with a second portion of the imaging sensor and extending through the substantially upright window; and
   the sensing data obtained by the sensing subsystem includes visual data obtained by the imaging subsystem over the first sub-FOV.

2. The indicia reader of claim 1, wherein in the second mode the controller causes the illumination subsystem to provide illumination at a greater intensity than in the first mode.

3. The indicia reader of claim 1, wherein in the second mode the controller causes the imaging subsystem to capture image data at a greater framerate than in the first mode.

4. The indicia reader of claim 1, wherein in the second mode the controller causes the decode module to analyze the at least the portion of the image data to decode the indicium and in the in the first mode the controller at least one of (i) causes the decode module to not analyze the at least the portion of the image data to decode the indicium, or (ii) cause the indicia reader to not transmit a payload associated with the indicium to a host.

5. The indicia reader of claim 1, wherein the triggering event includes detecting an object appearing within the first sub-FOV.

6. The indicia reader of claim 5, wherein sensor pixels associated with the first sub-FOV receive light along an optical path that is angled at up to 20 degrees relative to an axis normal to the substantially horizontal window.

7. The indicia reader of claim 1, wherein the triggering event includes detecting the object appearing within an edge portion of the first sub-FOV.

8. The indicia reader of claim 1,
   wherein the imaging subsystem includes a depth sensor, and
   wherein the sensing data obtained by the sensing subsystem includes depth data obtained by the depth sensor through the substantially horizontal window.

9. The indicia reader of claim 8, wherein the triggering event includes detecting an object above the upper surface of the lower housing based on the depth data obtained by the depth sensor.

10. The indicia reader of claim 1, wherein the controller is further configured to cause the indicia reader to transition from operating in the second mode to the first mode responsive to the sensing subsystem not detecting, through the substantially horizontal window, a subsequent triggering event for a predetermined time.

11. The indicia reader of claim 1, wherein the controller is further configured to cause the indicia reader to transition from operating in the first mode to the second mode without regard for secondary sensed data sensed through the substantially vertical window.

* * * * *